(12) United States Patent
Hipp

(10) Patent No.: US 6,859,835 B1
(45) Date of Patent: Feb. 22, 2005

(54) VIRTUAL PORT MULTIPLEXING

(75) Inventor: Burton A. Hipp, Elk Grove, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 845 days.

(21) Appl. No.: 09/684,457

(22) Filed: Oct. 5, 2000

Related U.S. Application Data (60) Provisional application No. 60/157,727, filed on Oct. 5, 1999, provisional application No. 60/157,728, filed on Oct. 5, 1999, provisional application No. 60/157,729, filed on Oct. 5, 1999, provisional application No. 60/157,833, filed on Oct. 5, 1999, and provisional application No. 60/157,834, filed on Oct. 5, 1999.

(51) Int. Cl.[7] .................... G06F 15/16; G06F 15/173
(52) U.S. Cl. .................... 709/227; 709/245; 709/223
(58) Field of Search ................... 709/216–219, 709/223–226, 227, 245, 231, 238

(56) References Cited

U.S. PATENT DOCUMENTS

| | | | |
|---|---|---|---|
| 4,160,877 A | 7/1979 | Vander Mey | 179/15 BA |
| 5,537,417 A | 7/1996 | Sharma et al. | |
| 5,621,726 A | 4/1997 | Murakimi | |
| 5,734,865 A | 3/1998 | Yu | |
| 5,764,639 A | 6/1998 | Staples et al. | 370/401 |
| 5,819,112 A | 10/1998 | Kusters | 395/856 |
| 5,848,242 A | 12/1998 | Behaghel et al. | |
| 5,867,661 A | 2/1999 | Bittinger et al. | |
| 5,923,854 A | 7/1999 | Bell et al. | |
| 5,951,650 A | 9/1999 | Bell et al. | |
| 6,061,349 A * | 5/2000 | Coile et al. | 370/389 |
| 6,094,712 A | 7/2000 | Follett et al. | |
| 6,201,962 B1 | 3/2001 | Sturniolo | |
| 6,216,159 B1 | 4/2001 | Chintakrindi et al. | |
| 6,247,057 B1 | 6/2001 | Barrera, III | |
| 6,327,622 B1 | 12/2001 | Jindal et al. | |
| 6,430,622 B1 | 8/2002 | Aiken et al. | |
| 6,542,934 B1 | 4/2003 | Bader et al. | |
| 6,704,282 B1 | 3/2004 | Sun et al. | |
| 6,707,820 B1 | 3/2004 | Arndt et al. | |
| 6,714,549 B1 | 3/2004 | Phaltankar | |

FOREIGN PATENT DOCUMENTS

WO          WO 99/48261          9/1999

* cited by examiner

*Primary Examiner*—Ario Etienne
*Assistant Examiner*—Hussein Chanti
(74) *Attorney, Agent, or Firm*—Lawrence J. Merkel; Meyertons, Hood, Kivlin, Kowert & Goetzel, P.C.

(57) ABSTRACT

To achieve the foregoing, and in accordance with the purpose of the present invention, a method and apparatus is disclosed which provides communication between at least two applications. The communication is achieved by accepting a connection from a second application on a first port and allocating a second port to receive the communication from the second application. Once the second port has been allocated the second port translation is recorded. The communication is sent to the first port from the second application and received on the second port. The communication is then delivered to a first application from the second port. In one embodiment the first application requests the communication from the first port and the first port is translated to determine the second port such that the communication is delivered to the first application in the step of delivering the communication to the first application.

32 Claims, 10 Drawing Sheets

VIRTUAL PORT MULTIPLEXING

REFERENCE TO RELATED APPLICATIONS

The present application claims priority to and incorporates the following applications by reference: DYNAMIC SYMBOLIC LINK RESOLUTION, Prov. No. 60/157,728, filed on Oct. 5, 1999; SNAPSHOT VIRTUAL TEMPLATING, Prov. No. 60/157,729, filed on Oct. 5, 1999; SNAPSHOT RESTORE OF APPLICATION CHAINS AND APPLICATIONS, Prov. No. 60/157,833, filed on Oct. 5, 1999; VIRTUAL RESOURCE-ID MAPPING, Prov. No. 60/157,727, filed on Oct. 5, 1999; and VIRTUAL PORT MULTIPLEXING, Prov. No. 60/157,834, filed on Oct. 5, 1999.

FIELD

The present invention relates generally to the multiplexing of ports. More specifically, the present invention relates to the rerouting of communication to alternative ports allowing a plurality of computers and/or applications to send and receive data directed at the same port number.

BACKGROUND

Prior art computers communicate or transmit data through communication channels accessed through ports. A port is an endpoint to a logical connection. Communication between computers is achieved by forwarding data to a particular address, such as an IP address, on a predefined port number. Each port has a port number and the port number identifies what type of port each port is. For example, port 80 is used for HTTP traffic. Ports are utilized in several different protocol networks including TCP/IP and UDP networks.

When a first application running on a first computer transmits data directed to a second application on a second computer, the first application will transmit the data directed at a predefined port to be received by the second computer and application. If the port is unknown, the data cannot be forwarded. Further, if a first application is currently listening on a given port, a second application that listens on the same port will fail because the port is already in use. The port cannot be initialized for listening by the second application if the port is already in use by the first application.

SUMMARY

To achieve the foregoing, and in accordance with the purpose of the present invention, a method and apparatus is disclosed which provides communication between at least two applications. The communication is achieved by accepting a connection from a second application on a first port and allocating a second port to receive the communication from the second application. Once the second port has been allocated the second port translation is recorded. The communication is sent to the first port from the second application and received on the second port. The communication is then delivered to a first application from the second port. In one embodiment the first application requests the communication from the first port and the first port is translated to determine the second port such that the communication is delivered to the first application in the step of delivering the communication to the first application.

In one embodiment, the communication is received on the first port following the step of sending the data to the first port, the first port is translated to determine the second port prior to the step of receiving the communication on the second port, and the step of receiving the communication on the second port includes queuing the communication on the second port from the first port.

In one embodiment, the second application requests to connect with the first port prior to the step of accepting the connection. Once the second port is allocated, the second port is negotiated including negotiating the second port between a first and second virtual port multiplexer. Further, the second application is connected with the second port following the step of allocating the second port. The step of recording the translation including, first, recording the translation of the second port in association with the first application, and second, recording the translation of the second port in association with the second application.

BRIEF DESCRIPTION OF THE DRAWINGS

The invention, together with further advantages thereof, may best be understood by reference to the following description taken in conjunction with the accompanying drawings in which.

DETAILED DESCRIPTION

Among other aspects and innovations, the invention provides structure, system, method, method of operation, computer program product, and business model and method for providing multiplexing of a port, for example a TCP/IP port, into multiple virtual ports. Where a port, in one embodiment, is a bidirectional software construct identifying a data stream. The novel port multiplexing provided by the present invention allows multiple applications and processes, such as multiple socket-based server processes, to utilize the same port number without interfering with the operation and data transfer associated with each application and process. In one embodiment, the present method and apparatus allows a plurality of different computers to direct data communication at the same port number without interference, while still maintaining accurate communication. In one embodiment, the present method and apparatus transparently redirects communication to alternate ports establishing independent data streams without an application's knowledge.

By allowing the multiplexing of a port into multiple virtual ports, multiple applications and processes, such as socket-based applications and processes, can monitor, accept and transmit data on the same port number, while each application and process functionally receives a unique port to send and receive data. In one embodiment, the virtual port multiplexing allows two separate instances of the same application to operate on the same computer without interference between the two instances, and while avoiding errors or misdirected data during data communication. For example, two separate instances of the same application will direct data to the same port. Thus potential errors are likely to result due to the separate instances attempting to simultaneously send or receive data on the same port. The present invention will prevent this potential conflict by rerouting at least one of the instances by multiplexing the port and transparently rerouting the at least one instance to an alternative port. Further, the present invention allows a plurality of computers to communicate while the plurality of computers attempt to reference the same port without interfering or corrupting the data transferred. In one embodiment, the virtual port multiplexing is accomplished without interaction from the applications or processes, and further, the applications or processes are unaware of the virtual streams. The applications or processes only have knowledge of the original fixed port number.

Figure 1A:
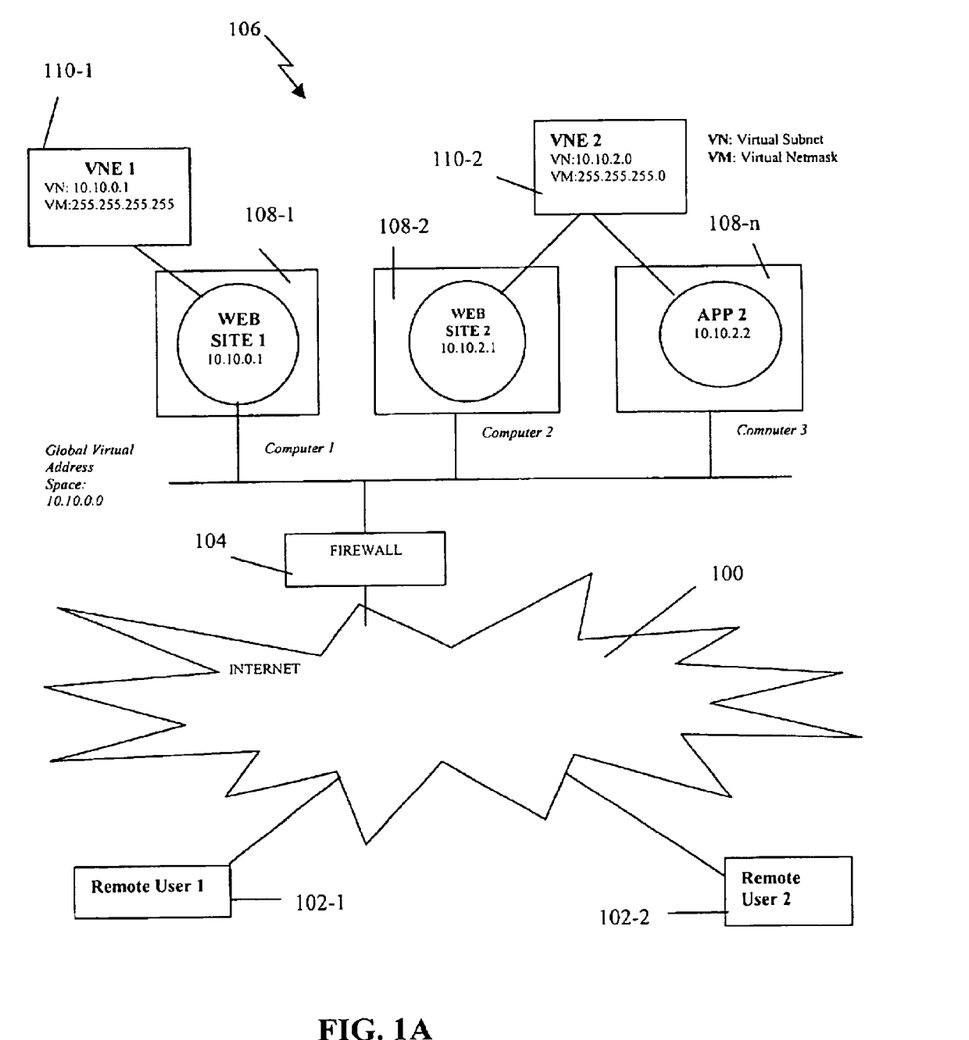
FIG. 1A is a high level block diagram illustrating the various components of a computer network used in connection with the present invention.

FIG. 1A illustrates in high level block diagram form the overall structure of the present invention as used in connection with a global computer network 100 such as the Internet. Remote users 102-1 and 102-2 can connect through the computer network 100 to a private network of computers 106 protected by firewall 104. Computer network 106 is a network comprising computers 108-1, 108-2, through 108-$n$, where n is the total number of computers in network 106. Computers 108 are used to run various applications, as well as host web sites for access by remote users 102. The present invention is implemented on computer network 106 in the form of virtual environments 110-1 and 110-2. While only two virtual environments are illustrated, it is to be understood that any number of virtual environments may be utilized in connection with the present invention.

Figure 1B:
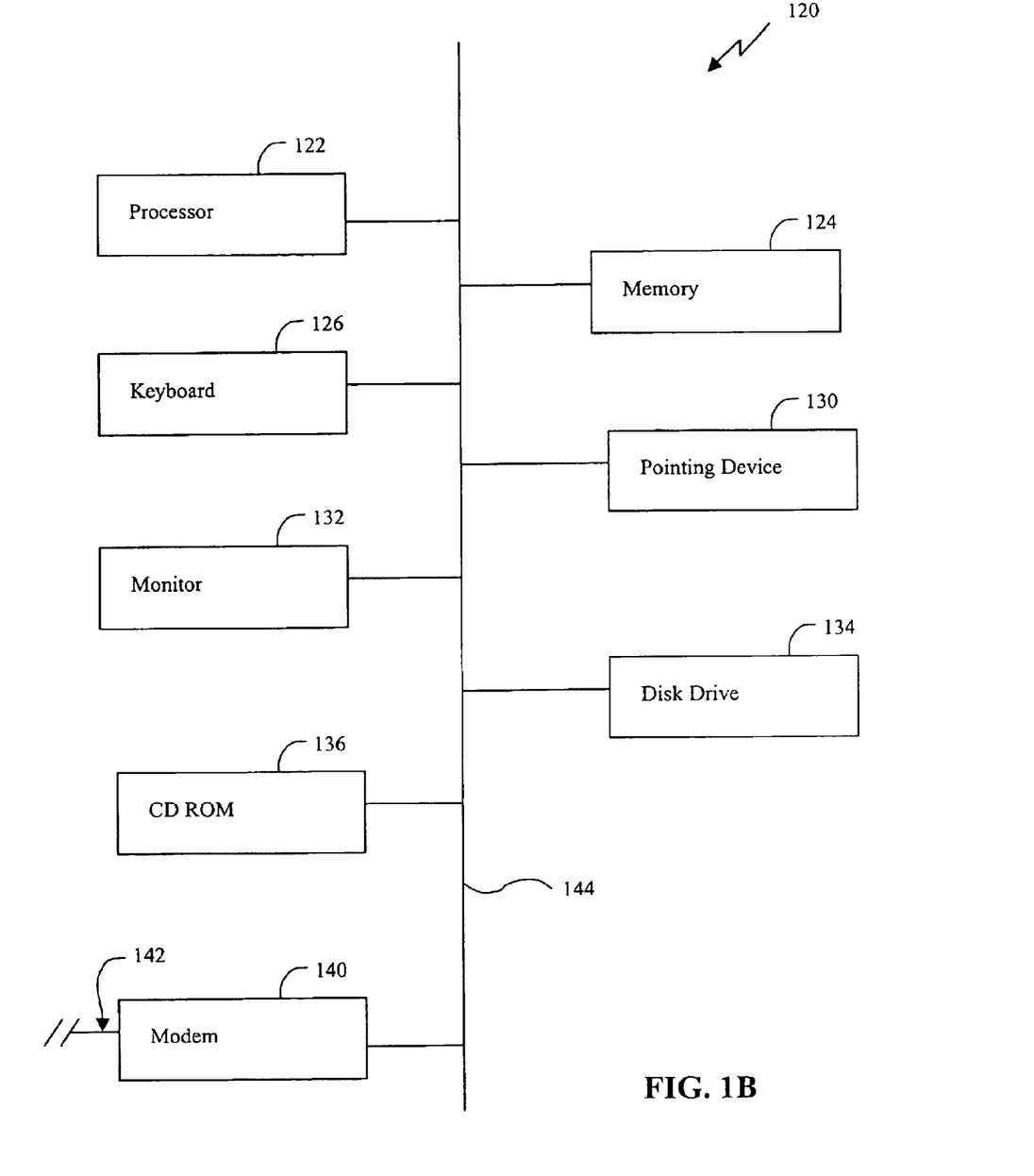
FIG. 1B is a high level block diagram a computer which, in one embodiment, is utilized to implement the present virtual port multiplexing.

In one embodiment, the method and system of the present invention is implemented in a computer readable medium, such as a computer program executed on a computer 120 as illustrated in the high level block diagram of FIG. 1B. As shown, computer 120 incorporates a processor 122 utilizing, in one embodiment, a central processing unit (CPU) and supporting integrated circuitry. A memory 124 which is any type or combination of memory including fast semiconductor memory (e.g., RAM, NVRAM or ROM), slower magnetic memory (e.g., hard disk storage), optical memory and any conventional memory known in the art, to facilitate storage of the computer program and the operating system software. In one embodiment, also included in computer 120 are interface devices including, but not limited to, keyboard 126, pointing device 130, and monitor 132, which allow a user to interact with computer 120. Mass storage devices such as disk drive 134 and CD ROM 136 may also be included in computer 120 to provide storage of information. Computer 120 may communicate with other computers and/or networks via modem 140 and telephone line 142 to allow for remote operation, or to utilize files stored at different locations. Other media may also be used in place of modem 140 and telephone line 142, such as a direct connection, high speed data line or a wireless connection, and the like. In one embodiment, the components described above may be operatively connected by a communications bus 144. In one embodiment, the components may be operatively connected by wireless communication.

Figure 2:
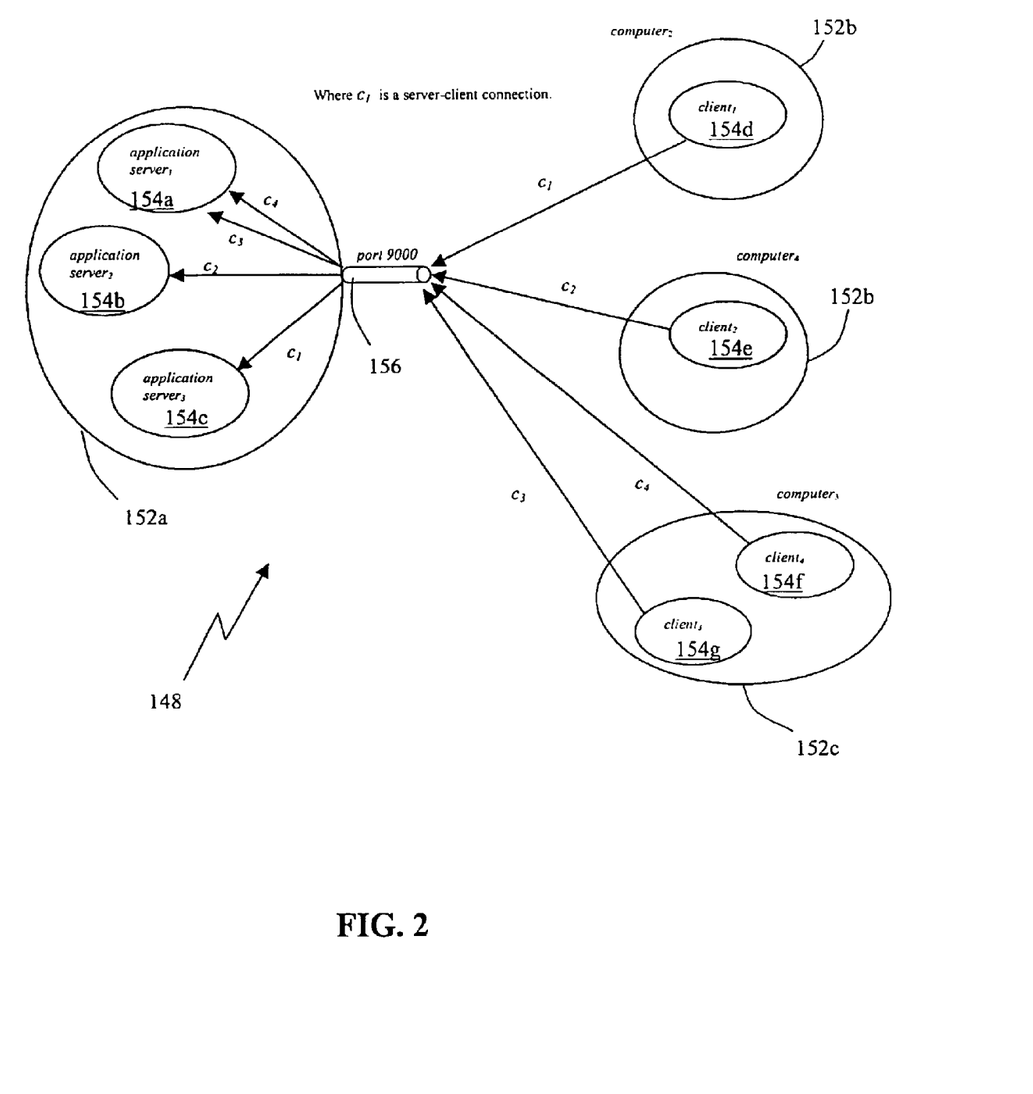
FIG. 2 shows one implementation of one embodiment of the novel virtual port multiplexing (VPM) system which allows communication between a plurality of computers operating at least one application and/or process.
Figure 3:
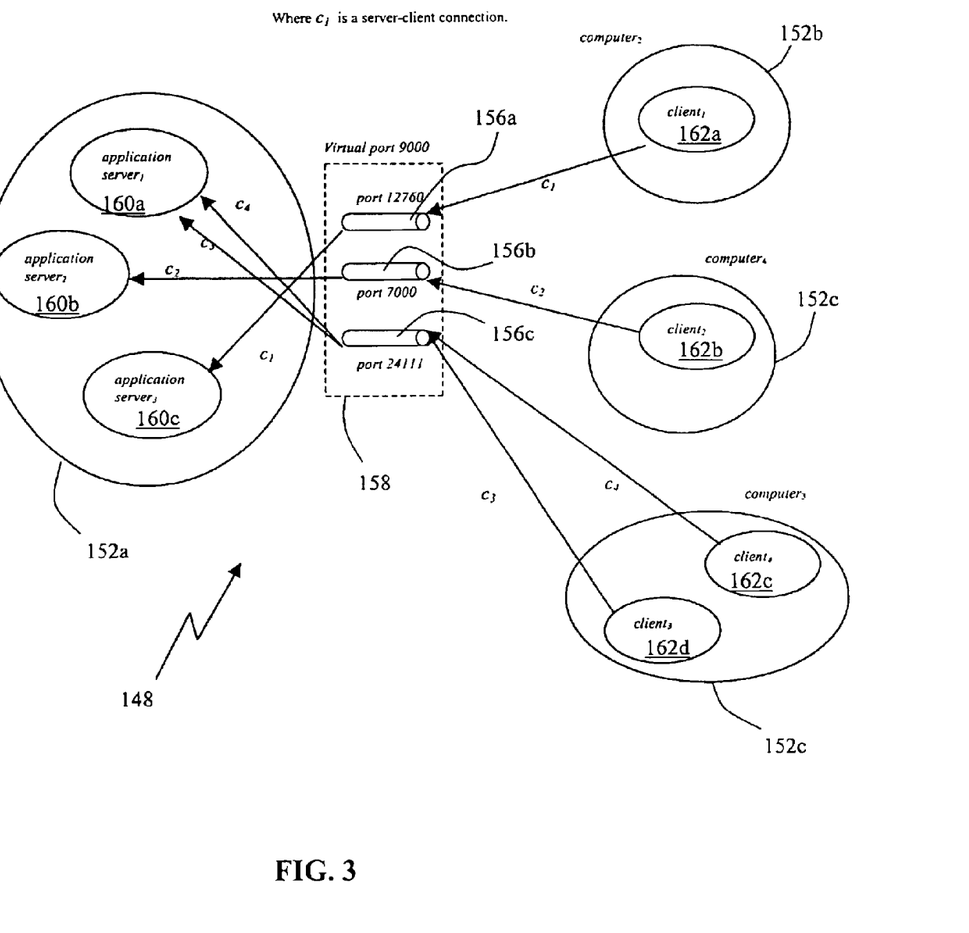
FIG. 3 shows a simplified block diagram of the VPM similar to that shown in FIG. 2, where, in one embodiment, the VPM system routes the connections $c_{1-4}$ through a virtual port.

FIG. 2 shows one implementation of one embodiment of the novel virtual port multiplexing (VPM) system 148 which allows communication between a plurality of computers 152$a$–$d$ operating at least one application and/or process 154$a$–$g$. Accurate communication is maintained by the present VPM system 148 even though the data communicated to and from the plurality of applications 154 are directed to the same port number 156, for example port 9000. The communication of the plurality of applications, all directing and receiving communicated data at the same port number is further achieved without interference between the computers 152$a$–$c$ and applications 154$a$–$g$, and without errors in the communicated data. In one embodiment, the VPM system 148 redirects the communication of the computers 152$a$–$d$ and applications 154$a$–$g$ to different virtual ports and thus avoids interferences. The embodiment of FIG. 2 shows that computers 152$a$–$d$ and applications 154$a$–$g$ attempting to use the same port 156 are being provided functionally independent connections $c_{1-4}$ across that port 156. FIG. 3 shows a simplified block diagram of the VPM 148 similar to that shown in FIG. 2, where, in one embodiment, the VPM system 148 routes the connections $c_{1-4}$ through a virtual port 158. Functionally, the VPM transparently reroutes communication traffic connections $c_{1-4}$ to separate ports 156$a$–$c$ thus avoiding interference and errors. The VPM system 148 allows a plurality of computers 152$a$–$d$ and applications 154$a$–$g$ to logically operate simultaneously when designating the same port without interfering and without losing information or data.

Still referring to FIGS. 2 and 3, the computers 152 are any computer system or network. For example, computer 152$a$ is a computer having a plurality of servers 160$a$–$c$ providing application processing. Computers 152$b$–$c$ are individual computers providing a client or client application 162$a$–$b$ with access to computer 152$a$ and server applications 160$a$–$c$. Computer 154$d$ is a computer network having at least two clients 162$c$–$d$ allowing access to computer 152$a$ and servers 160$a$–$c$. In one embodiment, computer 152 is a single network location or address regardless of the number of physical computers represented by the single address, whether operating server applications 160 or client applications 162. In one embodiment, servers 160$a$–$c$ are physically independent computer systems within a computer network 152$a$. In one embodiment, servers 160$a$–$c$ are server applications, such as software programs, which provide services by listening and responding to network requests on an IP address and a port, such as port 9000. In one embodiment, a port is a pre-assigned port that is known to provide a predefined service. One example of an server application 160 is a Web Server with a database module that provides real estate listings, that listens on a TCP port 80 for HTTP requests. Another example is a service provided over the Internet such as driving directions and detailed maps obtain from a web site, such as Yahoo Maps®. In one embodiment, clients 162a–d are physically independent computer systems within a computer or computer network. In one embodiment, clients 162a–d are client applications, such as software programs, which attempt to communicate with other computers 152 and/or applications 154 at predefined IP addresses through network connections $c_{1-4}$ directed at predefined ports. An example of a client application is a java applet running within a Web browser, or an internet browser itself such as Netscape Browser® or Internet Explorer®.

Figure 4:
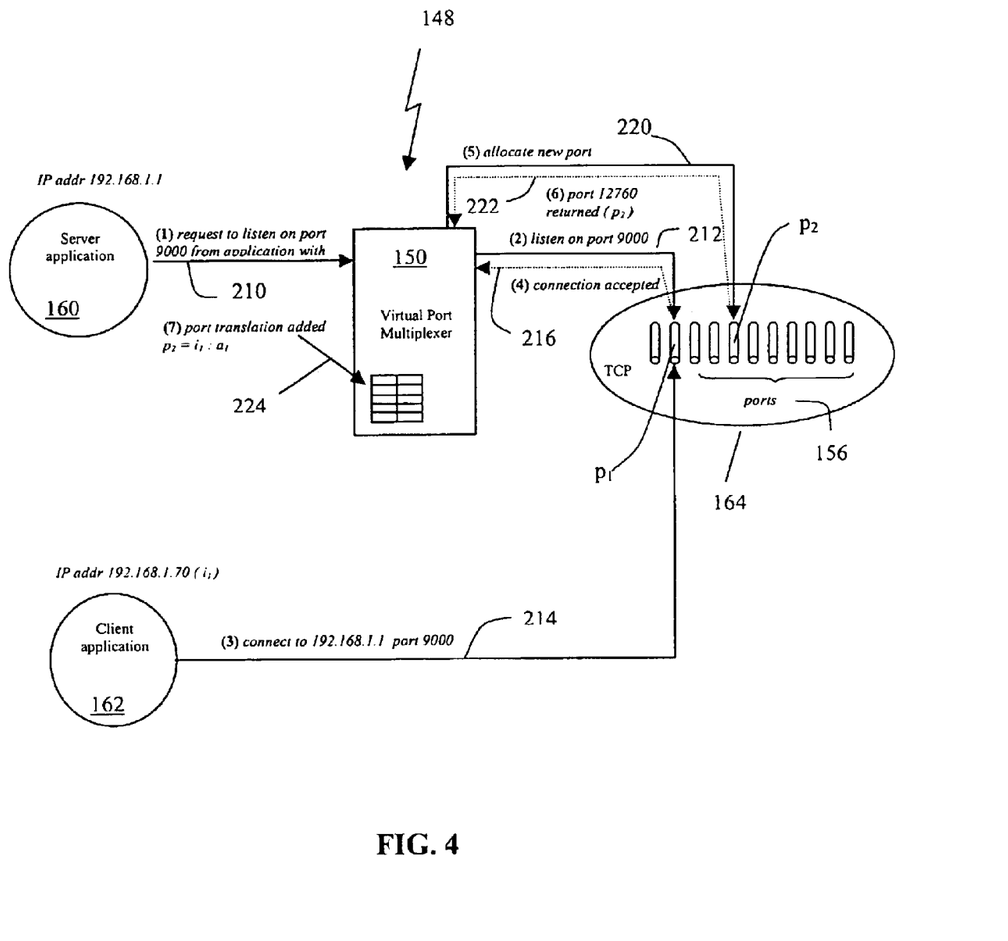
FIG. 4 depicts a simplified block diagram of the VPM system providing multiplexing or rerouting of a port allowing communication between at least two applications.

FIG. 4 depicts a simplified block diagram of the VPM system 148 providing multiplexing or rerouting of a port 156 allowing communication between at least two applications. In the embodiment shown in FIG. 4, the VPM system 148 provides non-cooperative multiplexing in that only one of the two applications attempting to communicate is rerouted to an alternate port to send and receive data. In one embodiment of non-cooperative multiplexing, a first application, for example server application 160 having an associated IP address, such as 192.168.1.1, and an application identifier (AID) $a_1$, requests to listen (step 210) on an initial port $p_1$, for example port 9000, for communication or requests from a second application. In one embodiment, AID is a computer network wide unique identifier that corresponds with a specific instance of a running application which is defined in any number of ways including defining the AID in reference to a logical task to be performed by the associated application, by the logical user that is running the associated application and any other way of defining known in the art. The VPM 150 receives the request from server application 160 and begins to listen on initial port $p_1$, port 9000, for a connection or request from a second application (step 212). Once a second application, for example a client application 162 having an associated IP address $i_1$, such as 192.168.1.70, attempts to connect with server application 160 at IP address 192.168.1.1 (step 214) through port 9000, VPM 150 receives the connection and a connection is accepted (step 216). The VPM 150 multiplexes the communication connection by allocating a second or new port to provide the communication path between server application 160 and client application 162 (step 220). A new port $p_2$ is then returned (step 222), for example port 12760, to VPM 150. The VPM 150 then records the port translation of the new port $p_2$ by associating at least the new port $p_2$ with the AID $a_1$ for the server application 160 and the IP address $i_1$ of the client application 162 (step 224) to allow mapping between the initial port $p_1$, port 9000, and the new port $p_2$, port 12760. Once the VPM 150 has allocated and recorded the new port $p_2$, data can be transferred between the applications utilizing the virtual port 9000 which is functionally the new port $p_2$. In one embodiment, recording the port translation is achieved by adding the new port number along with the associated IP addresses and AIDs in a lookup table.

Figure 5:
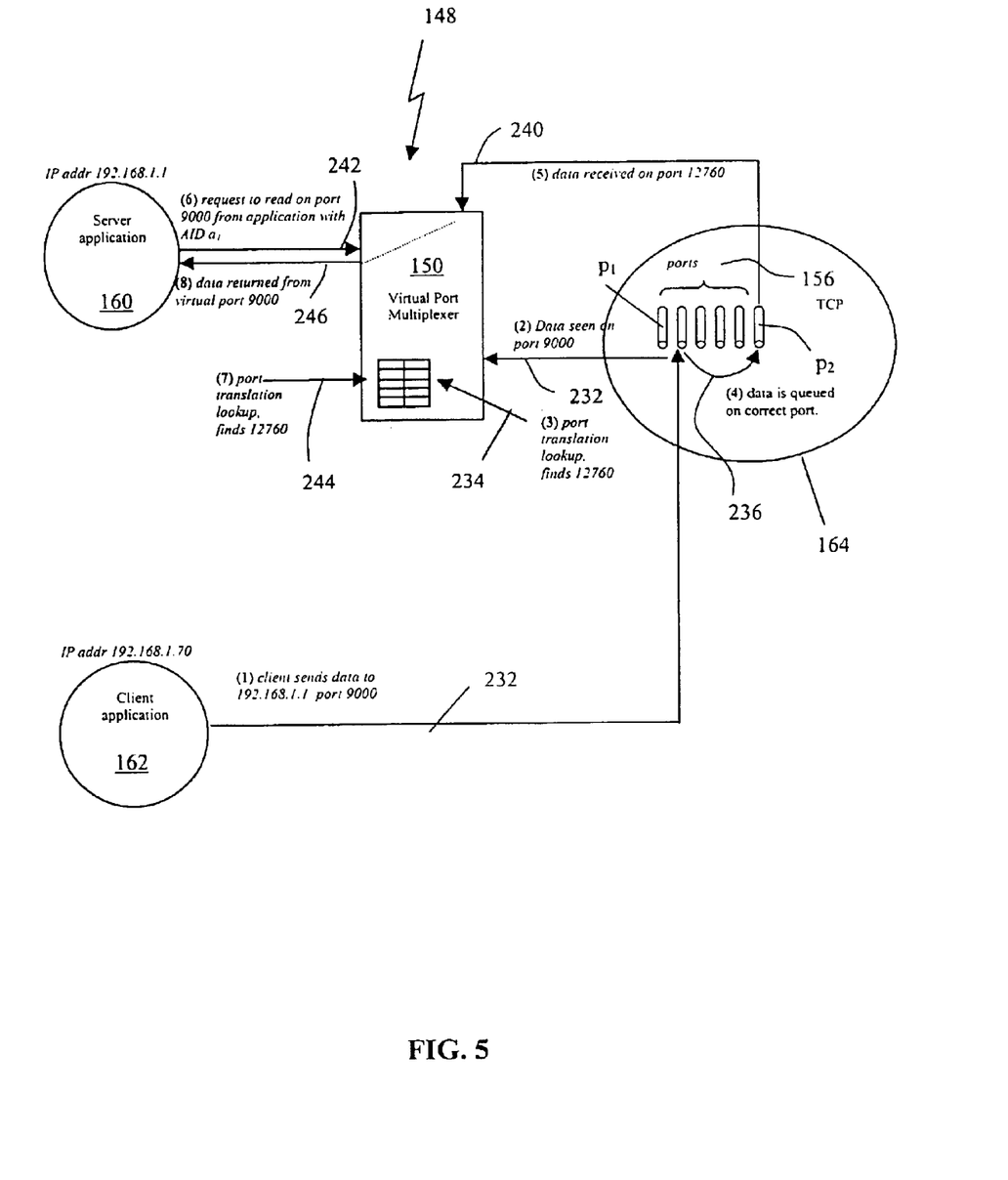
FIG. 5 shows a simplified block diagram of VPM and the communication or data transfer between two applications under the non-cooperative multiplexing once the virtual port has been established as shown in FIG. 4.

FIG. 5 shows a simplified block diagram of VPM 150 and the communication or data transfer between two applications under the non-cooperative multiplexing once the virtual port has been established as shown in FIG. 4. Once VPM 150 has multiplexed the port connection to the new port $p_2$, the applications can begin communication and data transfer. For example, client application 162 sends data to server application 160 at IP address 192.168.1.1 directed to the initial port $p_1$, port 9000 (step 230). The VPM 150 receives the data sent to port 9000 (step 232). The VPM 150 translates the initial port to determine the new port in which to redirect the data sent from the client application 162 (step 234). In one embodiment, the translation is achieved by relating the new port $p_2$ with at least the source IP address of the client application 162. In one embodiment, the new port $p_2$ is further related with the AID of the server application 160, and the initial port $p_1$, port 9000. In one embodiment, the VPM 150 utilizes a translation look-up table to determine the new port $p_2$ based on at least the server AID $a_1$ and the client application IP address $i_1$. Once the VPM 150 determines the new port $p_2$, the data is redirected and queued on the new port $p_2$ (step 236). Once queued, the data is received over the new port $p_2$ (step 240). Once the server application 160 requests to read data on the initial port $p_1$, port 9000 (step 242), the VPM 150 translates the initial port $p_1$ to determine the multiplexed virtual port $p_2$, port 12760 (step 244). The data will then be forwarded from the new port $p_2$ to the server application 160 (step 246). From the server application's view, the data will appear to be received from the initial port $p_1$, port 9000. Thus, the server application 160 receives the data from a virtual port 9000.

Figure 6:
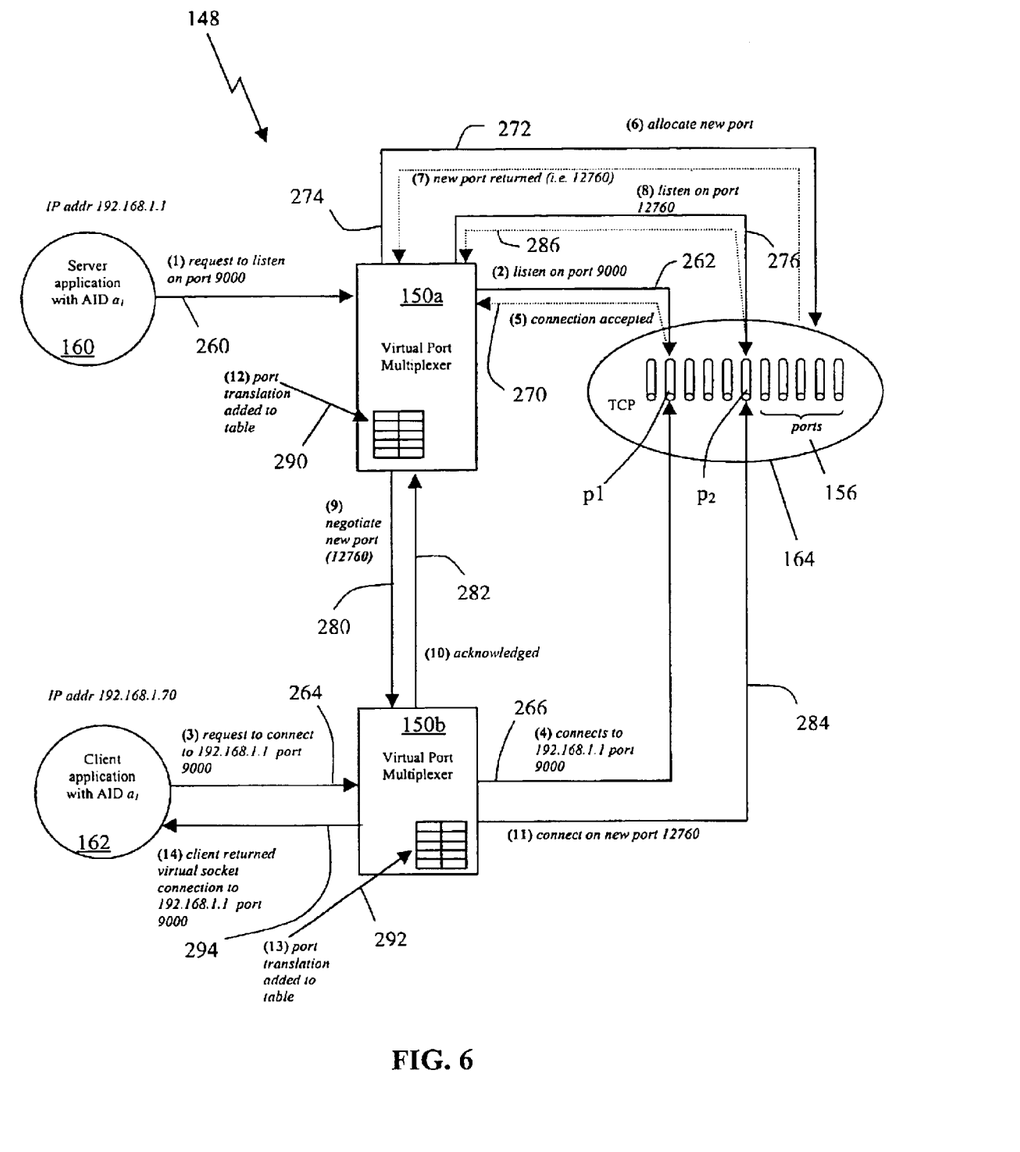
FIG. 6 shows a simplified block diagram of the VPM system where cooperative communication is achieved between two applications or processes each communicating through a VPM.

FIG. 6 shows a simplified block diagram of the VPM system 148 where cooperative communication is achieved between two applications or processes each communicating through a VPM 150a–b. As an example, the server application 160, with IP address 192.168.1.1 and AID $a_1$, requests to listen (step 260) on an initial port, for example port 9000. A first VPM 150a receives the request and begins to listen on the initial port $p_1$ (step 262). When client application 162, with IP address 192.168.1.70, requests to connect to server application 160 at IP address 192.168.1.1 on the initial port $p_1$ (step 264), a second VPM 150b receives the request and connects to server application 160 through the initial port $p_1$ (step 266). Following the client application request to connect with the initial port $p_1$, the connection is accepted (step 270), the first VPM 150a allocates a new port (step 272), and the new port $p_2$, for example port 12760, is returned (step 274). The first VPM 150a then listens on the new port $p_2$. The first VPM 150a will signal the second VPM 150b to negotiate or record the new port $p_2$ such that the client application 162 establishes a new communication connection to the server application 162 at 192.168.1.1 on the new port $p_2$, port 12760 (step 280). In one embodiment, negotiation between the first VPM 150a and the second VPM 150b to establish the new communication path through the new port $p_2$ is achieved if the client server 162 has an AID which matches the AID of the server application. If the AIDs of both applications do not match, the negotiation of the new port $p_2$ fails. As one example, the first VPM 150a sends a communication or message to the second VPM 150b that contains at least one AID $a_1$ of the server application 160 listening on the initial port $p_1$ (i.e., port 9000). The first VPM 150a may also forward the IP address and port of the requesting client application 162, and the new port $p_2$ (i.e., port 12760). The second VPM 150b receives the negotiation message and the second VPM 150b finds the AID $a_1$ corresponding to the requesting client IP address and port. If no AID is listed for that client IP address and port, the connection is terminated. If an AID is listed for that client IP address and port number, but does not correspond to any of the AIDs sent by the first VPM 150a, the connection is terminated. If the AID for that client IP address and port number is found and it does match one of the AIDs sent by the first VPM 150a, the second VPM 150b sends an acknowledgment (step 282) to the first VPM 150a.

Still referring to FIG. 6, once the new port $p_2$ has been negotiated between both VPMs 150a and 150b, the second VPM 150b acknowledges the new port $p_2$ to the first VPM 150a (step 282), and connects on the new port $p_2$ (step 284). Once the second VPM 150b connects with the new port $p_2$, the connection is accepted (step 286) by the transport protocol layer 164, such as a TCP layer. The first and second VPMs 150*a–b* register or record the port translation (step 290 and 292, respectively) and the second VPM 150*b* returns a virtual port connection or socket connection to the server application at IP address 192.168.1.1 over virtual port 9000 (step 294).

Figure 7:
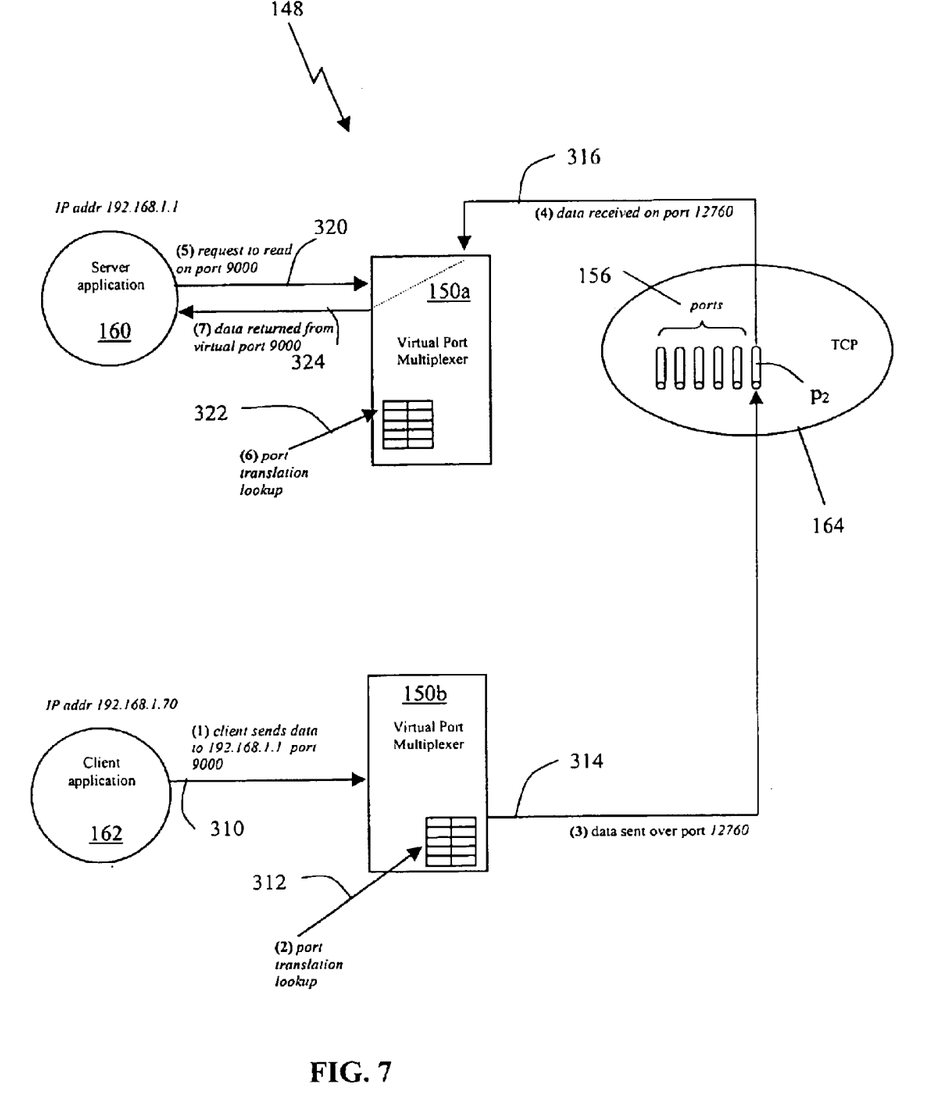
FIG. 7 shows a simplified block diagram of one implementation of one embodiment of the data transfer or communication through the VPM system providing cooperative communication similar to that shown in FIG. 6.

Once the new port $p_2$ has been negotiated and translated between both the first and second VPMs 150*a–b*, both the server and client applications are capable of transmitting and receiving data utilizing the virtual port. FIG. 7 shows a simplified block diagram of one implementation of one embodiment of the data transfer or communication through the VPM system providing cooperative communication similar to that shown in FIG. 6. In this embodiment, the client application 162 is transferring data to the server application 160 through the virtual port $p_2$. Initially client application 162 attempts to send data to server application at IP address 192.168.1.1 on an initial port $p_1$, for example port 9000 (step 310). The second VPM 150*b* receives the data and translates the initial port $p_1$ to the new port $p_2$ (step 312). In one embodiment, the translation by the second VPM 150*b* includes obtaining or extracting the client application AID $a_1$, the client source IP address (192.168.1.70) and client source port address, for example, port 24111 (not shown). The second VPM 150*b* then determines the rerouted destination, including server destination IP address (192.168.1.1) and server destination port or new port $p_2$ (for example, port 12760) as negotiated between first and second VPMs 150*a–b* (see step 280). Once the port translation is completed and the virtual port is returned, the data is sent over the new port $p_2$ (step 314) and received on the new port $p_2$ (step 316). Once the server application 160 requests to read the data on the initial port $p_1$ (step 320), the first VPM 150*a* translates the initial port $p_1$ to the new port $p_2$ (step 322) as negotiated. Once the first VPM 150*a* translates the initial port $p_1$, the data is then forwarded from the virtual port 9000 (new port $p_2$) to the server application 160 (step 324).

A similar translation is performed when a response is generated by the server application or when data is forwarded from the server application 160 to the client application 162. For example, when the server application 160 forwards the data to the first VPM 150*a*, the first VPM 150*a* extracts the server application AID $a_1$, the server application IP address (192.168.1.1) and the server application port number (9000). Using this information, first VPM 150*a* performs a lookup to determine where to reroute the response. For example, the response is rerouted to client application IP address (192.168.1.70) at client source port address (for example, 24111) through virtual port, which is functionally equivalent to the new port $p_2$.

In one embodiment, the redirecting or rerouting of the data to the new port $p_2$ includes rewriting the protocol headers and recalculating a corresponding checksum. When data is transferred between components of a computer network, often the data being transferred is packetized prior to transferring. The packets of data are often formatted with a header, to identify at least the destination, and usually the source of the data. Many packetized formats include additional information such as IP addresses, port numbers, and checksums in the data structure layout of a packet, such as a TCP packet as defined by a TCP protocol. In one embodiment of the present invention, the data is packetized and these packets are rerouted to the virtual ports as described above. Because the packets are rerouted from an initial port (i.e., port $p_1$) to alternate ports (i.e., new port $p_2$), the parameters of the header are altered to reflect the actual port providing the packet communication. In one embodiment, because the packets are being communicated through the virtual port, the headers of the packets are rewritten to designate the virtual port as the communication port. Thus, to ensure that the multiplexing of the ports is transparent to the applications communicating, the VPM system 148 alters the virtual port number in the header of each packet back to the initial port number (i.e., port $p_1$) before delivering the packets to the destination application or process thus making the virtualization transparent to the destination application or process receiving the packets. Changing the port number changes the checksum of the packet, so the VPM 150 further calculates a new checksum and replaces the old checksum in the packet with a new checksum. Thus allowing the packets of data to be effectively rerouted to and from the virtual ports transparently.

In one embodiment, virtual port multiplexing of the present invention allows for the implementation of a virtual layer in a protocol stack, such as a TCP/IP protocol stack. The virtual layer is implemented by intercepting a request to bind or connect to a specific socket, allocating an anonymous port, registering or storing a mapping between the original fixed port and the new anonymous port, and redirecting the request to the new port. As described above, packets of data are redirected by rewriting the protocol headers and recalculating the corresponding checksums.

In one embodiment, the present VPM system 148 groups applications or processes attempting to access the same port number. For example, if a first application or process is accessing a first port and has been allocated a first virtual stream, and another different application, another instance of the same application or another process attempts to access the same port number, the VPM system 148 will determine if the second application, instance or process has an AID that matches the first application's AID. If the AID is found to be the same as the first application, the different application, instance or process will receive the same virtualized stream. If the different application, instance or process AID does not match that of the first application's AID, a new virtualized stream is created.

In one embodiment, when VPM system 148 attempts to allocate a new virtualized port, a port must be available. In one embodiment, if a port is not available, the allocation of the virtualized port fails. In one embodiment, if there is not an available port when VPM system 148 attempts to allocate a new virtualized port, the request for the port is queued and VPM system 148 waits for a port to become available. In one embodiment, if the port does not become available within a predefined period, the attempt fails and an error signal is returned.

Figure 8:
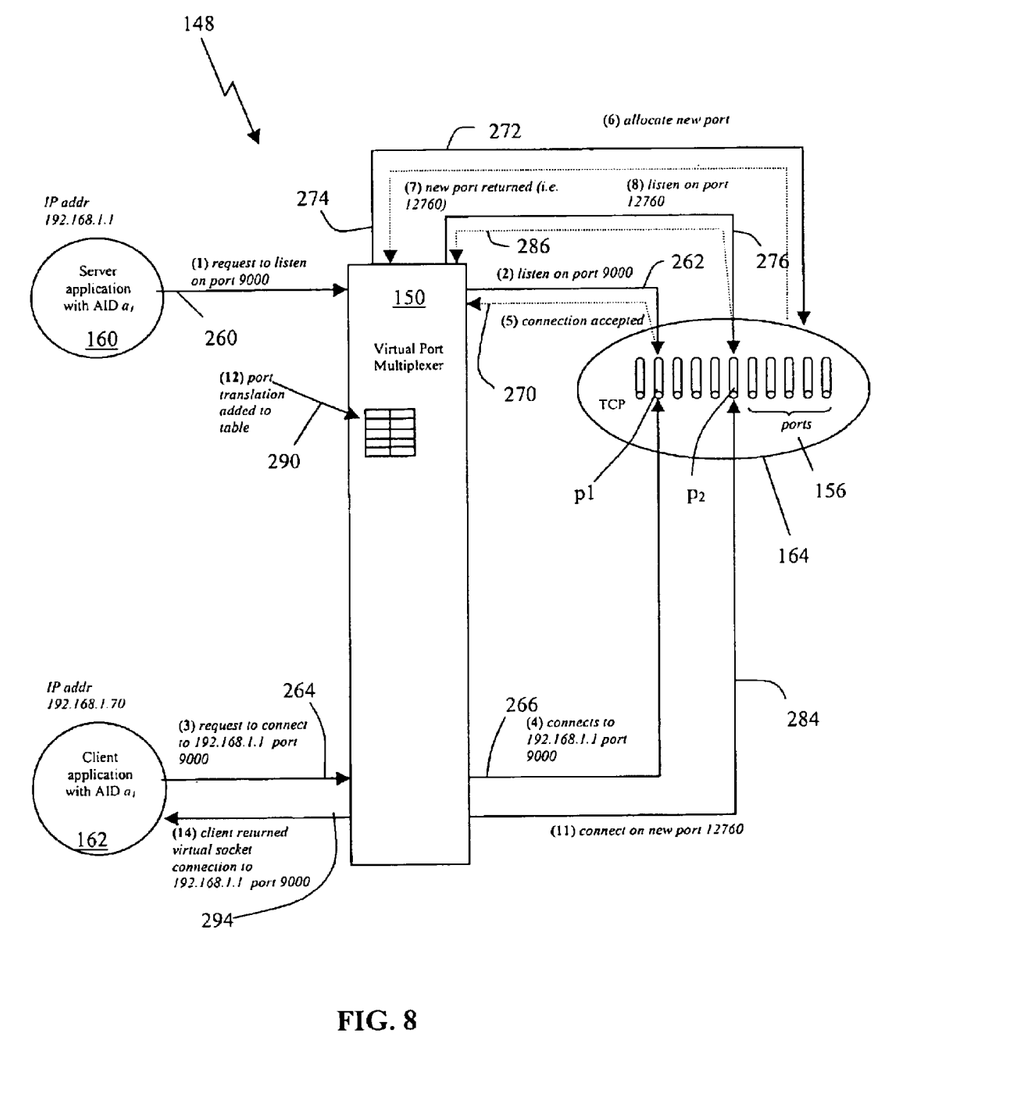
FIG. 8 shows a simplified block diagram of one implementation of one embodiment where cooperative multiplexing is provided between a first application and a second application through a single VPM.

FIG. 8 shows a simplified block diagram of one implementation of one embodiment where cooperative multiplexing is provided between the first application 160 and the second application 162 through a single VPM 150. As such, the single VPM 150 transparently reroutes the communication through the second port $p_2$ as described above.

Figure 9:
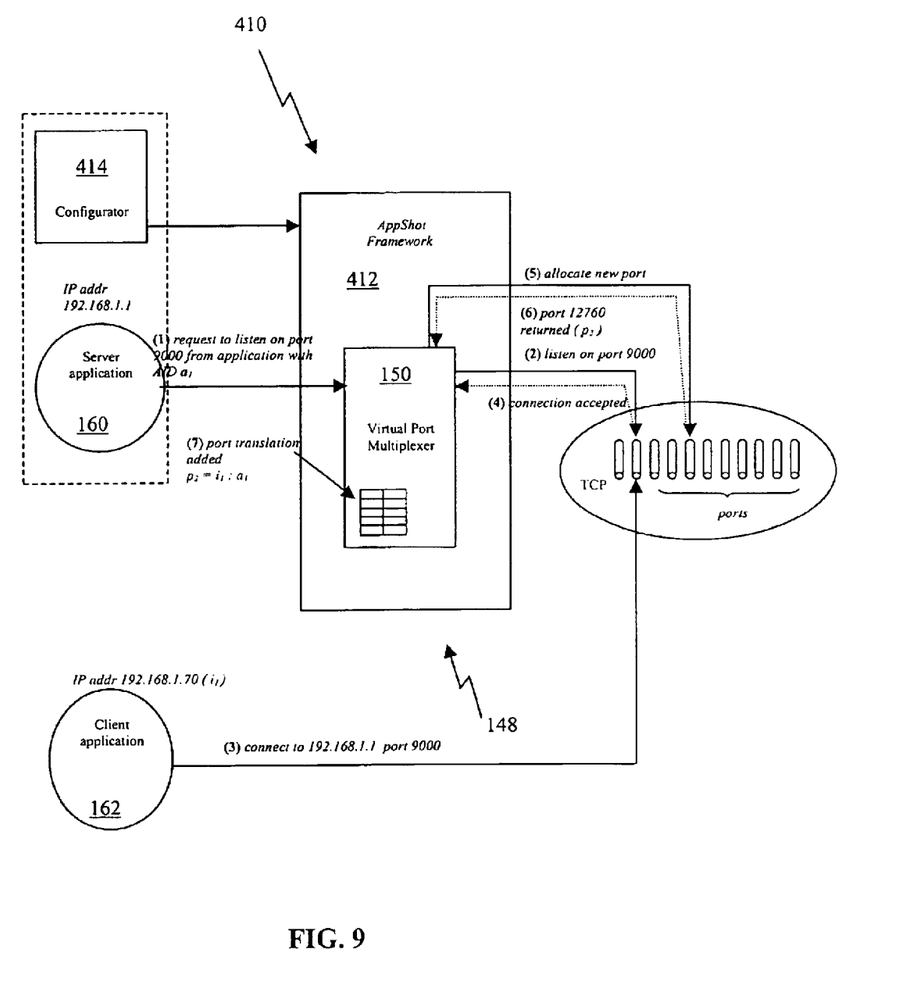
FIG. 9 shows a simplified block diagram of a computer system or network having an AppShot Framework and at least one application configurator.

FIG. 9 shows a simplified block diagram of a computer system or network 410 having an AppShot Framework 412 and at least one application configurator 414 associated with a first application 160. In one embodiment, the present VPM system 148 is included within the AppShot framework 412. In an alternative embodiment, VPM system 148 is a separate, independent system from the AppShot framework 412 and operates in cooperation with the AppShot framework 412. In one embodiment, the AppShot framework 412 is a software layer that processes relevant transactions between the applications and the operating system. Requests for system resources or changes to process states are routed internally and the AppShot framework 412 tracks these events.

In one embodiment, the application configurator 414 communicates configuration information regarding the associated application to aid in the initialization of the application. The configuration information includes any information relating to the associated application including, but not limited to, the AID of the associated application, and ports to be multiplexed. In an example for non-cooperative multiplexing, the configurator 414 supplies, for a given application pathname, at least the AID of the application. In one embodiment, the configurator 414 further supplies a list of port numbers, such as TCP port numbers, that are to be multiplexed by VPM and a list of source IP address/port number pairs that should correspond be routed to this AID. In an example for cooperative multiplexing, the configurator 414 supplies at least the AID of the application, and in one embodiment configurator 414 further supplies a list of port numbers that are to be multiplexed.

In one embodiment, the application configurator 414 operates without assistance from the application associated with the configurator 414. One example of an application configurator 414 is an application library. In one embodiment, application configurator 414 exists in the server application environment. In one embodiment, the application configurator 414 is implemented as a server process that proxies application information to an operating system as needed.

In one embodiment, the present invention further provides snapshot virtual templating by creating virtual application templates for the purpose of propagating a single application snapshot into multiple, distinct images. Snapshot virtual templates allow multiple application instances to use the same fixed resource identifier by making the resource identifier virtual, privatizing it, and dynamically mapping it to a unique system resource identifier. When a snapshot is cloned from a virtual template, the common or shared data is used exactly as is, whereas the non-sharable data is either copied-on-write, multiplexed, virtualized, or customized-on-duplication. The present invention greatly reduces the required administrative setup per application instance. Snapshot virtual templating works by noting access to modified resources, fixed system IDs/keys and unique process-related identifies and automatically inserting a level of abstraction between these resources and the application. The resources contained in a snapshot virtual template can be dynamically redirected at restore time. Access to memory and storage is managed in a copy-on-write fashion. System resource handles are managed in a virtualize-on-allocate fashion or by a multiplex-on-access mechanism. Process-unique resources are managed in a redirect-on-duplicate fashion. Rules may be defined through an application configurator that allows some degree of control over the creation of non-sharable data.

In one embodiment, the present invention further provides snapshot restoring by saving all process state, memory, and dependencies related to a software application to a snapshot image. Interprocess communication (IPC) mechanisms such as shared memory and semaphores must be preserved in the snapshot image as well. IPC mechanisms include any resource that is shared between two process or any communication mechanism or channel that allow two processes to communicate or interoperate is a form of IPC. Sockets, shared memory, semaphores and pipes are some examples of IPC mechanisms. Between snapshots, memory deltas are flushed to the snapshot image, so that only the modified-pages need be updated. Software modules that track usage of resources and their corresponding handles are included as part of the snapshot/restore framework of the present invention. At snapshot time, state is saved by querying the operating system kernel, the application snapshot/restore framework components, and the process management subsystem that allows applications to retrieve internal process-specific information not available through existing system calls. At restore time, the reverse sequence of steps for the snapshot procedure is followed and state is restored by making requests to the kernel, the application snapshot/restore framework, and the process management subsystem.

The present invention has been described generally as operating under or in cooperation with a TCP/IP protocol, however, the virtual port multiplexing apparatus and method is capable of providing virtual port multiplexing for communications and data being transferred under substantially any communication protocol. For example, the present VPM system 148 is capable of providing port multiplexing for protocols which supports point-to-point data links.

Having disclosed exemplary embodiments and the best mode, modifications and variations may be made to the disclosed embodiments while remaining within the scope of the present invention as defined by the following claims.

What is claimed is:

1. A method of providing communication between at least two applications, comprising:
   accepting a connection from a second application on a first port;
   allocating a second port to receive communication from the second application;
   recording a translation of the second port to the first port;
   the second application sending the communication to the first port;
   a first application requesting the communication from the first port;
   translating the first port in the request for the communication from the first application to the second port; and
   delivering the communication to the first application from the second port.

2. The method as claimed in claim 1, further comprising listening on the first port for the connection from the second application.

3. The method as claimed in claim 1 further comprising queuing the communication on the second port from the first port.

4. The method as claimed in claim 1, further comprising the second application requesting to connect with the first port prior to the accepting the connection.

5. The method as claimed in claim 1, further comprising negotiating the second port following allocating the second port.

6. The method as claimed in claim 5, wherein:
   negotiating the second port comprises negotiating the second port between a first virtual port multiplexer and a second virtual port multiplexer.

7. The method as claimed in claim 1, further comprising connecting the second application with the second port following allocating the second port.

8. The method as claimed in claim 7, wherein:
   recording the translation comprises:
      recording the translation of the second port in association with the first application; and recording the translation of the second port in association with the second application.

9. The method as claimed in claim 8, wherein:
recording the translation of the second port in association with the first application comprises recording the translation in a first virtual port multiplexer.

10. The method as claimed in claim 9, wherein:
recording the translation of the second port in association with the second application comprises recording the translation in a second virtual port multiplexer.

11. The method as claimed in claim 8, wherein:
the second application sending the communication to the first port comprises directing the communication at a first port number and translating the first port number to a second port number; and
sending the communication to the second port utilizing the second port number prior to receiving the communication on the second port.

12. The method as claimed in claim 7, further comprising returning to the second application a virtual socket connection to the first port prior to the second application sending the communication to the first port.

13. The method as claimed in claim 1, wherein:
delivering the communication to the first application from the second port comprises rewriting the communication to appear to the first application as though the communication is delivered from the first port.

14. The method as claimed in claim 13, wherein:
rewriting comprises rewriting a header of the communication to include a first port number identifying the first port.

15. The method as claimed in claim 14, wherein:
rewriting comprises rewriting the header of the communication to include a revised checksum.

16. A computer readable medium storing a plurality of instructions which, when executed, implement a method comprising:
accepting a connection from a second application on a first port;
allocating a second port to receive communication from the second application;
recording a translation of the second port to the first port;
receiving the communication on the first port from the second application;
receiving a request for the communication from a first application, the request including an indication of the first port;
translating the first port in the request for the communication from the first application to the second port; and
delivering the communication to the first application from the second port.

17. The computer readable medium as recited in claim 16 wherein the method further comprises queuing the communication on the second port from the first port.

18. The computer readable medium as recited in claim 16 wherein the method further comprises receiving a request from the second application to connect with the first port prior to the accepting the connection.

19. The computer readable medium as recited in claim 16 wherein the method further comprises negotiating the second port following allocating the second port.

20. The computer readable medium as recited in claim 19 wherein negotiating the second port comprises negotiating the second port between a first virtual port multiplexer and a second virtual port multiplexer.

21. The computer readable medium as recited in claim 16 wherein the method further comprises connecting the second application with the second port following allocating the second port.

22. The computer readable medium as recited in claim 21 wherein recording the translation comprises:
recording the translation of the second port in association with the first application; and
recording the translation of the second port in association with the second application.

23. The computer readable medium as recited in claim 22 wherein recording the translation of the second port in association with the first application comprises recording the translation in a first virtual port multiplexer.

24. The computer readable medium as recited in claim 23 wherein recording the translation of the second port in association with the second application comprises recording the translation in a second virtual port multiplexer.

25. The computer readable medium as recited in claim 16 wherein delivering the communication to the first application from the second port comprises rewriting the communication to appear to the first application as though the communication is delivered from the first port.

26. The computer readable medium as recited in claim 25 wherein rewriting comprises rewriting a header of the communication to include a first port number identifying the first port.

27. The computer readable medium as recited in claim 26 wherein rewriting comprises rewriting the header of the communication to include a revised checksum.

28. A system comprising a first computer configured to execute a first application and a second computer configured to execute a second application, wherein the first computer is in communication with the second computer during use, and wherein:
the first computer is coupled to receive a request for connection from the second computer on a first port, the request for connection responsive to the second application;
the first computer is configured to allocate a second port to receive communication from the second application;
the first computer is configured to record a translation of the second port to the first port;
the second application is configured to send the communication to the first port;
the first application is configured to request the communication from the first port;
the first computer is configured to translate the first port in the request for the communication from the first application to the second port; and
the first computer is configured to deliver the communication to the first application from the second port.

29. The system as recited in claim 28 wherein the second application is configured to listen on the first port for the connection from the second application.

30. The system as recited in claim 28 wherein the first computer is configured to queue the communication on the second port from the first port.

31. The system as recited in claim 28 wherein the first computer is configured to negotiate the second port with the second computer following allocating the second port.

32. The system as recited in claim 28, wherein the first computer recording the translation comprises:
recording the translation of the second port in association with the first application; and
recording the translation of the second port in association with the second application.

* * * * *